United States Patent
Mitra et al.

(10) Patent No.: US 6,192,463 B1
(45) Date of Patent: *Feb. 20, 2001

(54) PROCESSOR ARCHITECTURE SCHEME WHICH USES VIRTUAL ADDRESS REGISTERS TO IMPLEMENT DIFFERENT ADDRESSING MODES AND METHOD THEREFOR

(75) Inventors: Sumit K. Mitra, Tempe; Joseph W. Triece, Phoenix, both of AZ (US)

(73) Assignee: Microchip Technology, Inc., Chandler, AZ (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/946,426

(22) Filed: Oct. 7, 1997

(51) Int. Cl.$^7$ ......................................................... G06F 9/26
(52) U.S. Cl. ........................... 712/43; 712/39; 712/229; 711/202; 711/203
(58) Field of Search ..................... 395/800.43, 800.42; 711/200, 202, 203, 206, 214, 219, 6; 712/39, 42, 43, 200, 202, 203, 208, 210, 211, 229

(56) References Cited

U.S. PATENT DOCUMENTS

| | | | |
|---|---|---|---|
| 4,047,245 | 9/1977 | Knipper | 711/202 |
| 4,240,142 | 12/1980 | Blahut, et al. | 712/42 |
| 5,142,633 | 8/1992 | Murray, et al. | 712/225 |
| 5,261,039 | * 11/1993 | Miyzzaki | 395/144 |
| 5,715,418 | * 2/1998 | Atsatt et al. | 711/202 |
| 5,790,804 | * 8/1998 | Osborne | 395/200.75 |
| 5,860,155 | 1/1999 | Yu | 711/220 |

OTHER PUBLICATIONS

C.D. Hall and L.M. Hornung: "Indirect Instruction Set Architecture," IBM TECHNICAL DISCLOSURE BULLETIN, vol. 18, No. 4, pp. 963–964.

European Search Report.

* cited by examiner

Primary Examiner—Daniel H. Pan
Assistant Examiner—Dzung C Nguyen
(74) Attorney, Agent, or Firm—Baker Botts L.L.P.

(57) ABSTRACT

A processor architecture scheme which allows for encoding of multiple addressing modes through use of virtual register addresses in order to maximize number of directly addressable registers in the processor architecture scheme. A set of virtual address register locations associated with an indirect addressing pointer is reserved in memory. The number of virtual register address locations reserved is equal to a number of indirect addressing modes associated with the indirect addressing pointer. Each of the virtual register address locations initiates an indirect addressing mode to be used with the associated indirect addressing pointer when accessed.

21 Claims, 2 Drawing Sheets

PROCESSOR ARCHITECTURE SCHEME WHICH USES VIRTUAL ADDRESS REGISTERS TO IMPLEMENT DIFFERENT ADDRESSING MODES AND METHOD THEREFOR

BACKGROUND OF THE INVENTION

1. Field of the Invention

This invention relates generally to processors and, more specifically, to a processor architecture scheme and method which allows for the encoding of multiple addressing modes through virtual register addresses to maximize the number of directly addressable registers in the processor architecture scheme.

2. Description of the Prior Art

Generally speaking, a processor is an entity where a central processing unit (CPU) is present and is used to fetch and execute stored instructions or microcode. Some examples of processors are microcontrollers, microprocessors, and digital signal processors. Each type of processor operates on data which is also commonly referred to as operands. This data is generally stored in registers or memory space.

An instruction directs the CPU of a processor to execute a certain operation as well as to identify one or more operand(s) for the operation. Processors offer various means for addressing the data for an operation. These means are commonly referred to as addressing modes. The addressing modes are typically used for arithmetic and logical operations and data move operations and may apply to a source operand, a destination operand, or both.

The problem with current processor architecture schemes is that adding or changing addressing modes is extremely difficult. Without major changes to the instruction set organization, such changes and additions to the addressing modes are not possible. However, changes to the instruction set structure is not desirable since many tools such as assemblers and compilers will also require dramatic changes.

Another problem with the traditional method of encoding addressing modes in an instruction is that the number of directly addressable "registers" diminish significantly. For example, if 8-bits are available in an instruction word to specify a register operand, it would be possible to address 256 registers directly. However, in order to incorporate other addressing modes, and one of the 8-bits is taken away for this purpose, only 128 registers can now be directly addressed.

In existing processor architecture schemes, where alternate addressing modes are available, encoding is implemented through "control registers" in order to maximize the number of directly addressable registers. However, this creates yet another problem since "selection" of indirect addressing modes is static (until reconfigured) and not dynamic from instruction to instruction.

Therefore, a need existed to provide an improved microcontroller architecture scheme. The improved microcontroller architecture scheme must allow the user to add and change addressing modes. The improved microcontroller architecture scheme must further allow the user to change addressing modes dynamically on an instruction by instruction basis.

SUMMARY OF THE INVENTION

In accordance with one embodiment of the present invention, it is an object of the present invention to provide an improved microcontroller architecture scheme.

It is another object of the present invention to provide an improved microcontroller architecture scheme that allows the user to add and change addressing modes.

It is yet another object of the present invention to provide an improved microcontroller architecture scheme that allows the user to add and change addressing modes while maximizing the number of directly addressable registers.

It is still a further object of the present invention to provide the aforementioned improvements to the microcontroller architecture scheme while maintaining the ability to choose addressing modes dynamically on an instruction by instruction basis.

BRIEF DESCRIPTION OF THE PREFERRED EMBODIMENTS

In accordance with one embodiment of the present invention, a processor architecture scheme which allows for encoding of multiple addressing modes through use of virtual register addresses in order to maximize number of directly addressable registers in the processor architecture scheme is disclosed. The processor architecture scheme comprises the steps of: providing an instruction set for the processor to execute; dedicating a first section of each instruction of the instruction set to identify where each instruction is to be executed; establishing an indirect addressing pointer in memory; and establishing a dedicated set of the virtual register addresses in the memory equal to a number of indirect addressing modes associated with the indirect addressing pointer wherein each of the virtual register addresses dictate an indirect addressing mode to be used with the indirect addressing pointer when accessed thereby allowing flexibility of selecting addressing modes dynamically on an instruction by instruction basis.

In accordance with another embodiment of the present invention, a processor architecture scheme which allows for encoding of multiple addressing modes through use of virtual register addresses in order to maximize number of directly addressable registers in the processor architecture scheme is disclosed. The processor architecture scheme uses a central processing unit for executing the instruction. A memory unit is coupled to the CPU for storing data. A pointer register is established in the memory for storing an address location where the instruction is to access when an address associated with the pointer register is accessed. Dedicated virtual register address locations in the memory are established. The dedicated virtual register address locations associated with the pointer register dictates indirect addressing modes to be used with the pointer register when one of the dedicated address locations is accessed thereby allowing flexibility of selecting addressing modes dynamically on an instruction by instruction basis.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENTS

Figure 1:
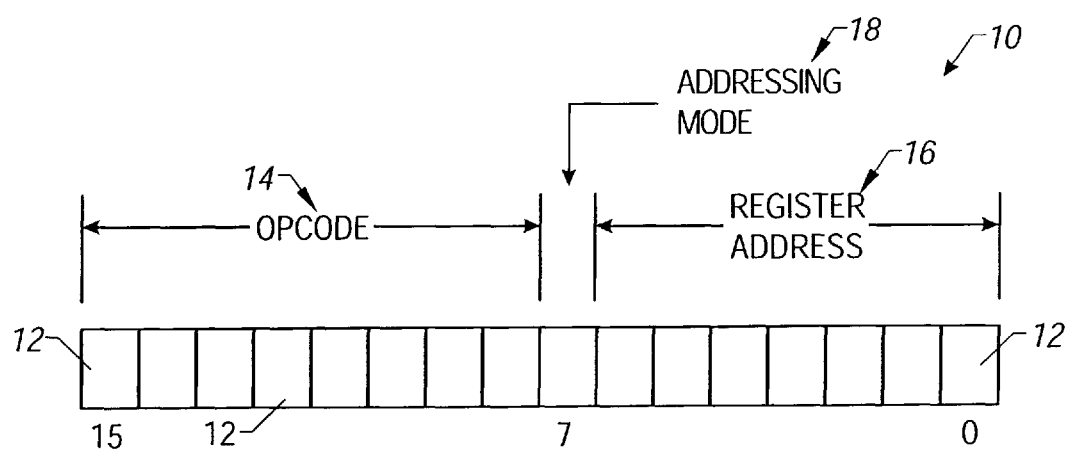
FIG. 1 is a simple block diagram depicting a typical encoding of a prior art instruction.

Referring to FIG. 1, a typical prior art instruction 10 to be executed by a processor is shown. The instruction 10 is comprised of a plurality of bits 12. The bits 12 are generally divided into three main fields: (1) an opcode field 14, (2) a register or data address field 16, and (3) addressing mode field 18. The opcode field 14 is a collection of bits 12 that specify the particular operation to be carried out by the processor. In general, there are three main types of operations: (1) arithmetic and logic operations (i.e., add, subtract, etc.); (2) data move operations; and (3) program control (e.g., branch operations). The register or data address field 16 points out the operand (i.e., data) on which the operation is to be carried out. It is possible to have more than one register or data address field 16. For example, there may be a source address field and a destination address field.

The instruction 10 shown in FIG. 1 is a 16 bit wide instruction. The 7th bit in the instruction 10 is used to select an addressing mode. If the 7th bit is a zero (0), direct addressing is implied. Thus bits <6:0> form a 7-bit register address which allows for 128 registers. If the 7th bit is a one (1), then an indirect address is implied. In this situation, bits <6:0> encode the data pointer address as well as pointer increment/decrement options.

In the prior art, 8-bits of the instruction are used to encode the "op-code". Therefore, 8-bits are left to address register locations. Using these 8 bits, up to 256 registers could be accommodated in the architecture. However, since the 7th bit is used as an addressing mode bit to differentiate between indirect addressing or direct addressing, only 128 registers are accommodated. Thus, the number of addressable registers is reduced by half by implementing an addressing mode bit. Furthermore, adding or changing addressing modes is extremely difficult. Without major changes to the instruction set organization, the changes or additions to the addressing modes are not possible. Any change to the instruction set structure is not desirable since many tools such as assemblers or compilers will also require dramatic changes.

An improvement to the addressing mode bit was implemented by MICROCHIP TECHNOLOGY in their PIC17C42A microcontrollers. In the instruction encoding, the register address was a direct address unless the address matched a specific address location (i.e., 00 hex), in which case the address was indirect. If the address is 00 hex, the register address will come from a pointer register. The option to increment or decrement the pointer register is determined by a control register. Several control bits in the control register will determine whether a post auto increment or a post auto decrement should be done on the pointer value, or whether the pointer value should be left unchanged.

One key benefit of the MICROCHIP TECHNOLOGY PIC17C42A microcontroller is that each instruction can now access the full range of 256 registers. Only one of the addresses is reserved to implement indirect address and is not a true address location. However, one significant drawback to this encoding scheme is that the increment/decrement options of the pointer registers is fixed and predetermined by the control bits in the control register. These options are not dynamic where at each instruction the user can make a choice on the increment and decrement option.

Figure 2:
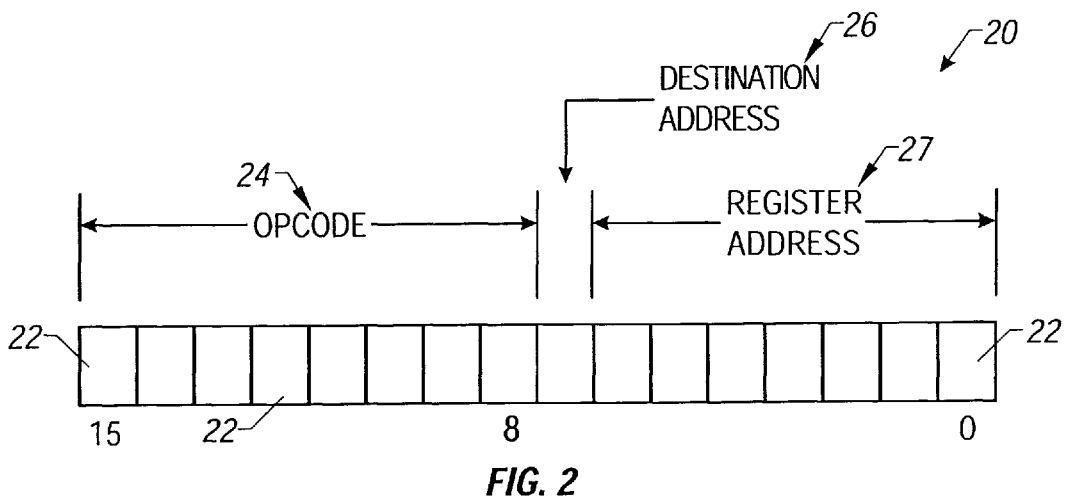
FIG. 2 is a simple block diagram depicting the encoding of an instruction using the present invention.

Referring to FIG. 2, an instruction 20 to be executed by the processor architecture scheme of the present invention is shown. The instruction 20 is comprised of a plurality of bits 22. The bits 22 are generally divided into three main fields: (1) an opcode field 24 which indicates what type of operation will be carried out, (2) a destination bit 26 which indicates where the result of the processor operation will be stored, and (3) register address field 28 which indicates the address of the register or data variable on which the instruction 20 is to operate. In the preferred embodiment of the present invention, the instruction is a 16 bit instruction.

Figure 3:
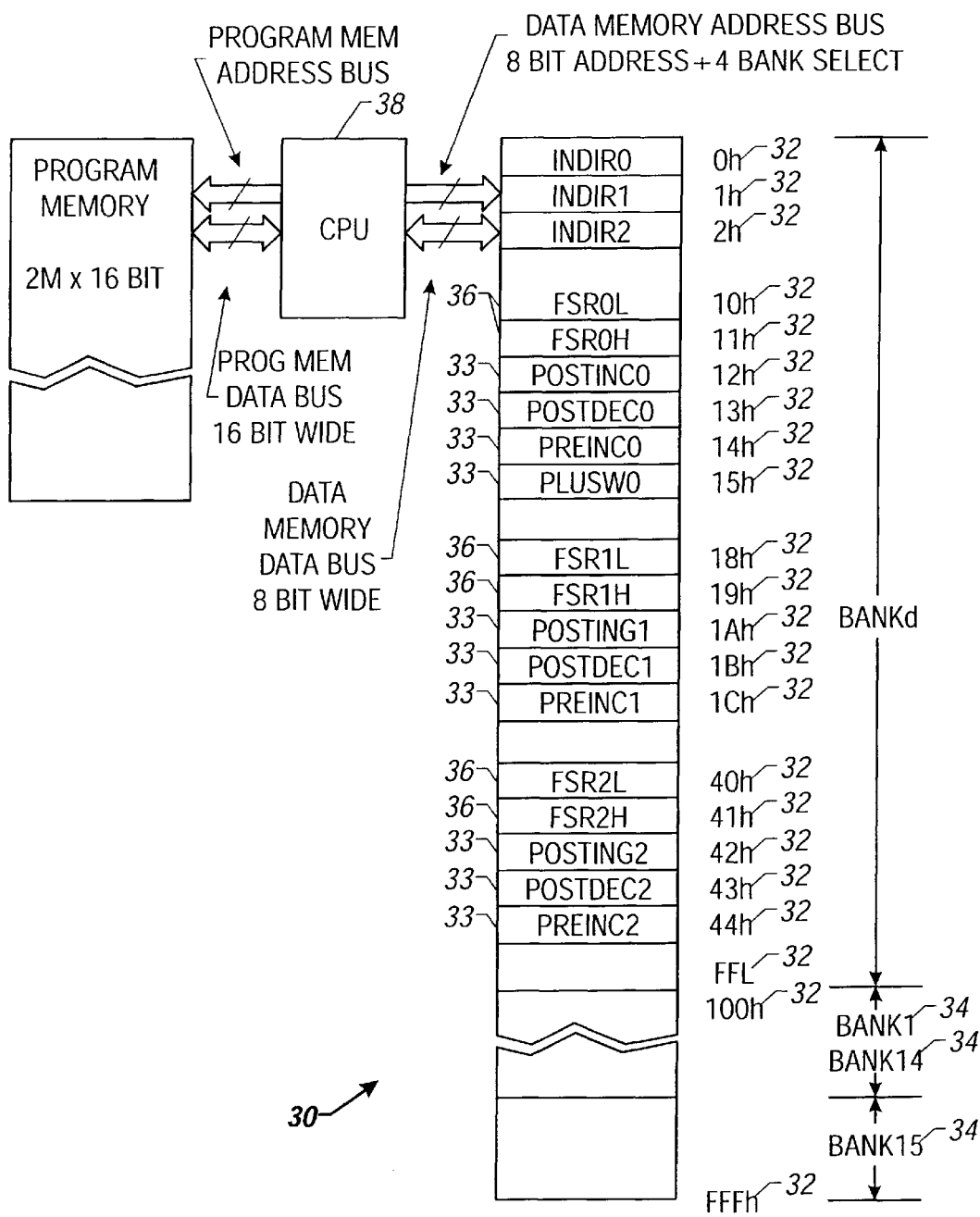
FIG. 3 is a simple block diagram of the data memory map using the present invention.

Referring to FIG. 3, a data pointer register 36 is implemented in data memory 30. The data memory 30 is comprised of a plurality of address locations 32. In the embodiment shown in FIG. 3, the memory is a linerized 4K memory which is divided into a plurality of pages 34 wherein each page 34 has 256 address locations 32. The data pointer register 36 has one or more virtual register address locations 33 reserved in the register address map. Each reserved virtual register address location 33 will initiate an indirect addressing mode when accessed.

Presently, there are five main types of addressing modes: simple indirect addressing, indirect addressing with auto post increment, indirect addressing with auto post decrement, indirect addressing with auto pre increment, and indirect addressing with offset. In a simple indirect addressing mode, the address of the operand is held in the data pointer register 36. The CPU 38 will first access the data pointer register 36 to get the address and using this address will access the operand. Indirect addressing with auto increment or auto decrement are forms of indirect addressing where the data pointer register 36 is incremented or decremented either before the data access (i.e., pre-increment or pre-decrement) or after the data access (i.e., post-increment or post-decrement). In an indirect addressing mode with offset, the address of the operand is calculated by adding an offset value to the contents of the data pointer register 36. The offset value may be embedded in the instruction or may come from yet another register. In the present embodiment, the offset value comes from the "w" register, which is the accumulator or "working" register. As before, the data pointer register 36 may be incremented or decremented before or after the operand access.

The data pointer register 36 will require a separate virtual register address location 33 in data memory 30 for each indirect addressing mode the data pointer register 36 wants to implement. In the preferred embodiment of the present invention, five virtual register address locations 33 are required to implement the five indirect addressing modes discussed above. However, additional or fewer indirect addressing modes may be implemented depending on the use of the data pointer register 36. Furthermore, additional data pointer registers 36 may be implemented in data memory 30. Each data pointer register 36 will have one or more virtual register address locations 33 reserved in the register address map. Each reserved virtual register address location 33 will initiate an indirect addressing mode for the associated data pointer register 36 when accessed. Each data pointer register 36 is a readable and writable address location. In the preferred embodiment of the present invention, each data pointer register 36 is a 12 bit wide pointer capable of accessing a 4K byte long memory area. Therefore, each data pointer register 36 is organized as two 8 bit wide registers (high byte and low byte) which are accessible as readable and writable registers. Thus, in the preferred embodiment of the present invention, 7 address locations are used to implement a 12 bit wide data pointer with five indirect addressing modes.

The present invention maximizes the number of register addresses that may be used as general purpose registers. In the instruction encoding technique using the preferred embodiment of the present method, 8 bits are available to address data memory or registers. This allows up to 256 registers. Since 7 of the registers are used to implement the various indirect addressing schemes, 249 directly addressable registers are possible. Additional data pointer registers 36 may further be added without dramatically reducing the amount of directly addressable registers. The present invention greatly increases the amount of addressable registers as compared to the prior art example depicted in FIG. 1.

The present invention allows the flexibility of adding or deleting indirect registers. Since the indirect registers are not encoded in the instruction itself but keyed off special register addresses, it is possible to add new data pointer registers 36. Thus, two different products based on the same processor may have different numbers of data pointer registers more easily than conventional methods.

The present invention also allows the flexibility of adding, deleting, or changing addressing modes. Just as data pointer registers 36 may be added or deleted easily, various addressing modes may be added or deleted easily. All that is required to add a new addressing mode is to designate a new data address location as a special address.

Using the present invention, it is possible to mix and match addressing modes and registers. Addressing modes in the prior art when encoded as part of an instruction format become fairly rigid. Using the present invention, it is possible to have any number of pointer registers with each one supporting any number and type of indirect addressing. The sum total of data pointer registers 36 and addressing modes are limited only by practical considerations of the amount of logic and circuitry required to implement them.

The present invention also allows the flexibility of being able to use any indirect addressing mode on an instruction by instruction basis. In the prior art PIC17C42A microcontroller, a special control register is used to control the variations of indirect addressing. The limitation of this is that once the control bits are set for a specific mode, all instructions can only use the select mode until the control bits are altered. This effectively reduces the choice of addressing modes in a given segment of code to one since it is impractical to change the control bits frequently. In the present invention, each variation of the indirect addressing is given a unique register address. Thus, it is possible to use any indirect addressing mode in any instruction.

OPERATION

Referring now to FIG. 3, the operation of the present invention will be discussed. Within the first page (i.e., Bank 0), the first 128 locations are reserved for special function registers. These locations are also where the special indirect addresses are located. One or more data pointer registers 36 will also be located in this area. Each data pointer register 36 will have one or more virtual register address locations 33 reserved in the register address map to initiate indirect addressing. If none of the indirect addressing locations are accessed, direct addressing will occur. If an instruction accesses one of the reserved address locations (i.e., address <4:0> in FIG. 3), an indirect addressing mode is to be used with the associated data pointer register 36. For example, if the instruction is "ADD w,12h", the instruction will normally add the contents of "w" with the contents in address 12h and place the answer in "w". However, since the address 12h is a reserved address location for the data pointer register 36 at addresses 10h, 11h , "w" will be added to the contents of the real location pointed to by the data pointer register 36 at addresses 10h, 11h. The total will then be stored in "w". Address 12h also states that a post increment is involved. Thus, the data pointer register 36 at addresses 10h, 11h will then be automatically incremented by 1.

While the invention has been particularly shown and described with reference to preferred embodiments thereof, it will be understood by those skilled in the art that the foregoing and other changes in form, and details may be made therein without departing from the spirit and scope of the invention.

What is claim is:

1. A processor architecture scheme which allows for encoding of multiple addressing modes through use of virtual register addresses in order to maximize number of directly addressable registers in said processor architecture scheme comprising the steps of:

providing an instruction set for said processor to execute;

dedicating a first section of each instruction of said instruction set to identify where each instruction is to be executed;

establishing an indirect addressing pointer in memory; and establishing a dedicated set of said virtual register addresses in said memory equal to a number of indirect addressing modes associated with said indirect addressing pointer wherein each of said virtual register address locations dictate an indirect addressing mode to be used with said indirect addressing pointer when accessed thereby allowing flexibility of selecting addressing modes dynamically on an instruction by instruction basis.

2. A processor architecture scheme which allows for encoding of multiple addressing modes through use of virtual register addresses in order to maximize number of directly addressable registers in said processor architecture scheme in accordance with claim 1 wherein said step of establishing a dedicated set of virtual register addresses in said memory further comprises the step of dedicating one virtual register address for initiating simple indirect addressing when accessed.

3. A processor architecture scheme which allows for encoding of multiple addressing modes through use of virtual register addresses in order to maximize number of directly addressable registers in said processor architecture scheme in accordance with claim 1 wherein said step of establishing a dedicated set of virtual register addresses in said memory further comprises the step of dedicating one virtual register address for initiating indirect addressing with auto post increment when accessed.

4. A processor architecture scheme which allows for encoding of multiple addressing modes through use of virtual register addresses in order to maximize number of directly addressable registers in said processor architecture scheme in accordance with claim 1 wherein said step of establishing a dedicated set of virtual register addresses in said memory further comprises the step of dedicating one virtual register address for initiating indirect addressing with auto post decrement when accessed.

5. A processor architecture scheme which allows for encoding of multiple addressing modes through use of virtual register addresses in order to maximize number of directly addressable registers in said processor architecture scheme in accordance with claim 1 wherein said step of establishing a dedicated set of virtual register addresses in said memory further comprises the step of dedicating one virtual register address for initiating indirect addressing with auto pre increment when accessed.

6. A processor architecture scheme which allows for encoding of multiple addressing modes through use of virtual register addresses in order to maximize number of directly addressable registers in said processor architecture scheme in accordance with claim 1 wherein said step of establishing a dedicated set of virtual register addresses in said memory further comprises the step of dedicating one virtual register address for initiating indirect addressing with offset when accessed.

7. A processor architecture scheme which allows for encoding of multiple addressing modes through use of virtual register addresses in order to maximize number of directly addressable registers in said processor architecture scheme in accordance with claim 1 wherein said step of establishing an indirect addressing pointer in said memory further comprises the step of establishing an indirect addressing pointer which is a 12 bit wide indirect addressing pointer.

8. A processor architecture scheme which allows for encoding of multiple addressing modes through use of virtual register addresses in order to maximize number of directly addressable registers in said processor architecture scheme in accordance with claim 1 further comprising the steps of:

establishing a plurality of indirect addressing pointers in said memory; and establishing a dedicated set of virtual register addresses in said memory equal to a total number of indirect addressing modes associated with said plurality of indirect addressing pointers wherein each virtual register address dictates an indirect addressing mode to be used with an associated indirect addressing pointer when accessed thereby allowing flexibility of selecting addressing modes dynamically on an instruction by instruction basis.

9. A processor architecture scheme which allows for encoding of multiple addressing modes through use of virtual register addresses in order to maximize number of directly addressable registers in said processor architecture scheme in accordance with claim 8 wherein said step of establishing a dedicated set of virtual register addresses in said memory equal to a total number of indirect addressing modes associated with said plurality of indirect addressing pointers further comprises the step of selecting an indirect address mode for each of said virtual register addresses.

10. A processor architecture scheme which allows for encoding of multiple addressing modes through use of virtual register addresses in order to maximize number of directly addressable registers in said processor architecture scheme in accordance with claim 9 wherein said step of selecting an indirect address mode for each of said virtual register addresses further comprises the step of selecting an indirect addressing mode from a group consisting of: simple indirect addressing, indirect addressing with auto post increment, indirect addressing with auto post decrement, indirect addressing with auto pre increment, and indirect addressing with offset.

11. A processor architecture scheme which allows for encoding of multiple addressing modes through use of virtual register addresses in order to maximize number of directly addressable registers in said processor architecture scheme in accordance with claim 9 wherein said step of establishing a plurality of indirect addressing pointers in said memory further comprises the step of establishing a plurality of indirect addressing pointers which are 12 bit wide indirect addressing pointers.

12. A processor architecture scheme which allows for encoding of multiple addressing modes through use of virtual register addresses in order to maximize number of directly addressable registers in said processor architecture scheme comprising, in combination:

a central processing unit for executing said instruction;

a memory coupled to said CPU for storing data;

a pointer register in said memory for storing an address location where said instruction is to access when an address associated with said pointer register is accessed;

dedicated virtual register address locations in said memory associated with said pointer register which dictates an indirect addressing mode to be used with said pointer register when one of said dedicated address locations is accessed thereby allowing flexibility of selecting addressing modes dynamically on an instruction by instruction basis.

13. A processor in accordance with claim 12 further comprising one virtual register address location dedicated for initiating simple indirect addressing when accessed.

14. A processor in accordance with claim 12 further comprising one virtual register address location dedicated for initiating indirect addressing with auto post increment when accessed.

15. A processor in accordance with claim 12 further comprising one virtual register address location dedicated for initiating indirect addressing with auto post decrement when accessed.

16. A processor in accordance with claim 12 further comprising one virtual register address location dedicated for initiating indirect addressing with auto pre increment when accessed.

17. A processor in accordance with claim 12 further comprising one virtual register address location dedicated for initiating indirect addressing with offset when accessed.

18. A processor in accordance with claim 12 wherein said pointer register is a 12 bit wide pointer register.

19. A processor in accordance with claim 12 further comprising:

a plurality of pointer registers in said memory; and dedicated virtual register address locations in said memory equal to a total number of indirect addressing modes associated with said plurality of pointer registers wherein each dedicated address location dictates an indirect addressing mode to be used with an associated pointer register of said plurality of pointer registers when accessed thereby allowing flexibility of selecting addressing modes dynamically on an instruction by instruction basis.

20. A processor in accordance with claim 19 wherein each of said plurality of pointer registers are 12 bit wide pointer registers.

21. A processor in accordance with claim 19 wherein each of said dedicated virtual register address locations in said memory equal to a total number of indirect addressing modes associated with said plurality of pointer registers initiates one indirect addressing mode from a group consisting of: simple indirect addressing, indirect addressing with auto post increment, indirect addressing with auto post decrement, indirect addressing with auto pre increment, and indirect addressing with offset.

* * * * *